Dec. 9, 1952     R. H. KOKE     2,620,561
GRASS AND WEED WHIP SICKLE
Filed Oct. 21, 1949
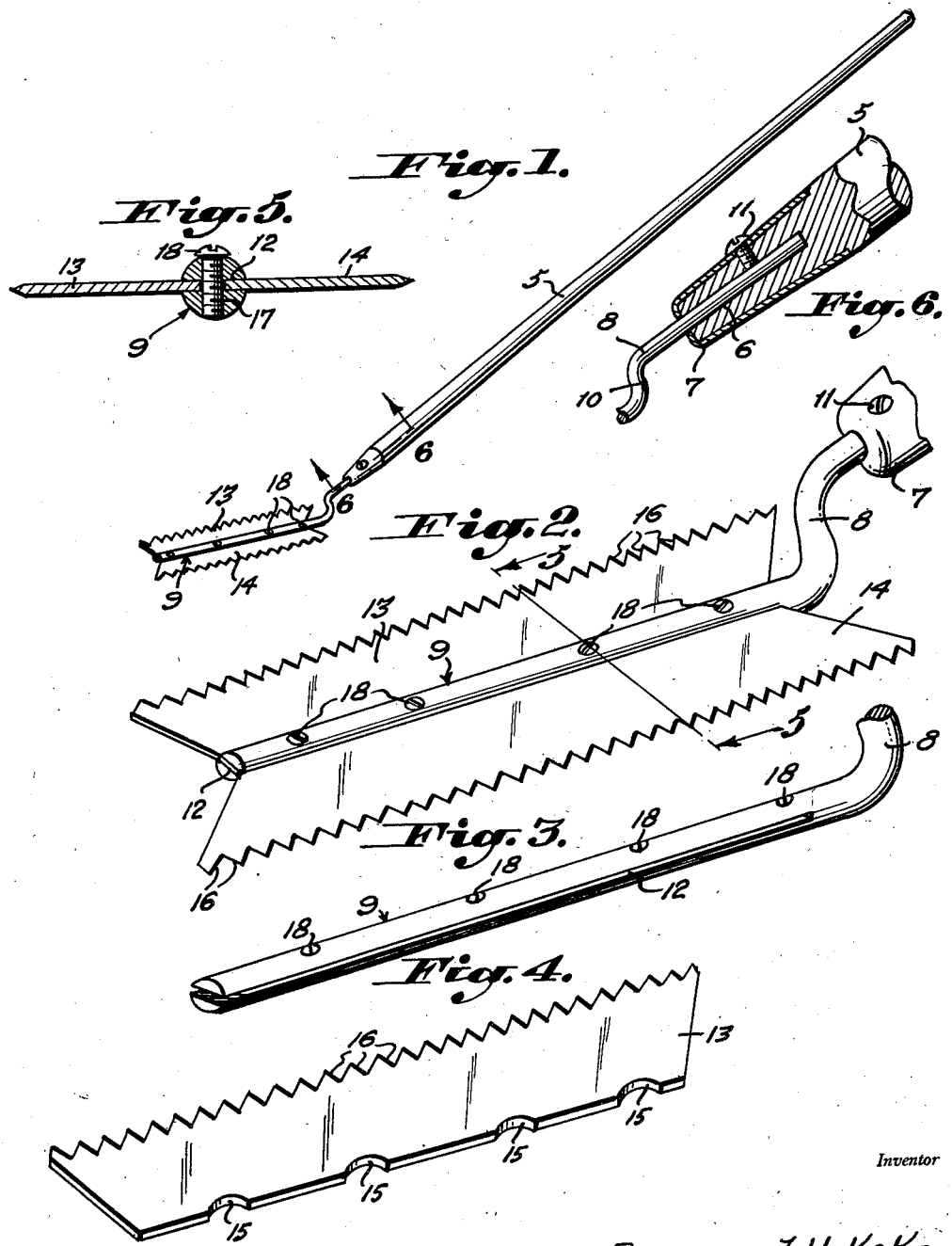
Inventor
Raymond H. Koke
By Patrick D. Beavers
Attorney Patented Dec. 9, 1952

2,620,561

UNITED STATES PATENT OFFICE 2,620,561

GRASS AND WEED WHIP SICKLE

Raymond H. Koke, Havana, Ill.

Application October 21, 1949, Serial No. 122,785

1 Claim. (Cl. 30—299)

The present invention appertains to improvements in grass and weed sickles of the "whip" type.

The principal object of the present invention is to provide a sickle whip wherein means are provided for the retention of separable blades, which can be removed to permit replacement or easy sharpening thereof.

Another important object of the invention is to provide a sickle whip which will last much longer than present types of whips now on the market, without substantially increasing the cost thereof.

These and other important objects and advantages of the invention will become apparent to the reader of the following description.

In the drawing:

Figure 1 is a perspective view of the implement.

Figure 2 is an enlarged fragmentary perspective view of the head portion of the implement.

Figure 3 is a fragmentary perspective view of the blade retaining arm of the head structure.

Figure 4 is a perspective view of one of the blades removed from the retaining arm.

Figure 5 is a cross-section taken substantially on line 5—5 of Figure 2.

Figure 6 is an enlarged fragmentary sectional view taken substantially on line 6—6 of Figure 1.

Referring to the drawing wherein like numerals designate like parts, it can be seen, that numeral 5 denotes an elongated handle having a recess 6 in one end and this end is tapered for a snug fit within a metallic shell 7, appertured at its reduced end to receive the shank 8 of an elongated blade retaining arm 9, there being a laterally disposed neck portion 10 connecting the shank 8 with the arm 9.

The shank 8 fits into the recess 6 of the handle 5 and a set screw 11 may be employed to retain this shank in place within the handle 5. Obviously other means may be employed for retaining the shank, and the shank may be of some other tang construction for retentive purposes.

The elongated blade retaining arm 9 is bifurcated or slotted as at 12 for the partial reception of blades 13, 14. These blades are of elongated dove-tail shape, flaring as shown, the inner edges being formed with curved notches 15 whereas the outer portions are serrated or undulated and sharpened to provide cutting edges, as denoted by numeral 16.

The notched edges fit into the slot 12 from opposite sides of the retaining arm 9, and as can be seen in Figure 3, the furcations of this arm 9 have a plurality of registering openings formed inwardly therethrough, as at 17 to receive screws 18. The inner edges of the blades 13, 14 may abut each other, with the notches 15 forming openings through which the screws 18 pass. Obviously by tightening these screws, the furcations of the blade retaining arm 9 are clamped against the inner edges of the blades and firmly retain these blades in the position substantially shown in Figure 2.

The implement is used in the conventional way, being swung back and forth over weeds or grass to cut the same down to a point where a lawn mower may be used for mowing.

When the blades 13, 14 become dull, they can be conveniently removed, simply by unloosening the screws 18, which permits the blades 13, 14 to be taken away from the arm 9 without fully unloosening the screws. The blades may be replaced with new blades or sharpened and replaced as conditions justify.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A sickle whip comprising an elongated handle, a curvate shank extending from said handle, a retaining arm formed integrally with said shank, and having a centrally disposed longitudinal slot extending inwardly from the free end thereof, a pair of elongated blade members each having a sharpened outer edge and each having an inner edge relatively shorter than said outer edge and provided with a plurality of spaced notches therein, said inner edges being receivable in said slot and said notches of the pair of blades being registerable with each other, and a series of screws each extending through said retaining arm and through an opening provided by the registering notches, said outer edges of said blade extending in the general direction of the handle beyond the juncture point between said shank and said retaining arm.

RAYMOND H. KOKE.

REFERENCES CITED

The following references are of record in the file of this patent:

UNITED STATES PATENTS

| Number | Name | Date |
|---|---|---|
| 1,903,789 | Michaels | Apr. 18, 1933 |
| 2,070,041 | Coe | Feb. 9, 1937 |
| 2,312,133 | Thompson | Feb. 23, 1943 |